(12) United States Patent
Stephens

(10) Patent No.: US 9,195,234 B2
(45) Date of Patent: Nov. 24, 2015

(54) DYNAMIC POSITIONING SYSTEMS AND METHODS

(71) Applicant: GE ENERGY POWER CONVERSION TECHNOLOGY LTD, Rugby (GB)

(72) Inventor: Richard Ian Stephens, Rugby (GB)

(73) Assignee: GE ENERGY POWER CONVERSION TECHNOLOGY LTD. (GB)

( * ) Notice: Subject to any disclaimer, the term of this patent is extended or adjusted under 35 U.S.C. 154(b) by 30 days.

(21) Appl. No.: 14/085,852

(22) Filed: Nov. 21, 2013

(65) Prior Publication Data
US 2015/0142227 A1 May 21, 2015

(51) Int. Cl.
*G05D 1/02* (2006.01)
*B63H 25/42* (2006.01)

(52) U.S. Cl.
CPC .............. *G05D 1/0208* (2013.01); *B63H 25/42* (2013.01)

(58) Field of Classification Search
CPC ...... B63H 25/42; B63H 25/425; B63H 25/44; B63H 25/46; B63H 25/465; B63H 25/48
USPC ............................................................ 701/21
See application file for complete search history.

(56) References Cited

U.S. PATENT DOCUMENTS

| | | | |
|---|---|---|---|
| 6,848,382 B1 | 2/2005 | Bekker | |
| 7,565,876 B2 | 7/2009 | Wilson et al. | |
| 7,818,103 B2 | 10/2010 | Johansen et al. | |
| 8,145,371 B2 | 3/2012 | Rae et al. | |
| 2006/0058921 A1* | 3/2006 | Okamoto | 700/255 |
| 2010/0088030 A1 | 4/2010 | Stephens et al. | |
| 2013/0019790 A1* | 1/2013 | Flint et al. | 114/144 B |
| 2013/0029543 A1 | 1/2013 | Gjerpe | |

FOREIGN PATENT DOCUMENTS

| | | |
|---|---|---|
| AU | 2007256046 | 12/2007 |
| CA | 2814897 | 5/2012 |
| CN | 101665150 | 3/2010 |
| CN | 102791571 | 11/2012 |
| CN | 102812611 | 12/2012 |
| DK | 2161542 | 4/2011 |
| EP | 1812835 | 8/2007 |
| EP | 1896321 | 3/2008 |
| EP | 2024226 | 2/2009 |
| EP | 2161542 | 3/2010 |
| EP | 2332821 | 6/2011 |
| EP | 2447692 | 5/2012 |

(Continued)

OTHER PUBLICATIONS

Kongsberg, "Optimizing Complex Vessel Operations", Kongsberg K-Pos Dynamic Positioning, Page No. 3-11, May 2006.*

(Continued)

*Primary Examiner* — Fadey Jabr
*Assistant Examiner* — Aaron L Troost
(74) *Attorney, Agent, or Firm* — GE Global Patent Operation; Catherine J. Toppin

(57) ABSTRACT

Dynamic positioning systems and methods for controlling thrusters of a vessel. A dynamic positioning system includes a controller configured to predict position and heading of the vessel and efficiently control the the thrusters based on the predicted position and heading.

18 Claims, 6 Drawing Sheets

(56) References Cited

FOREIGN PATENT DOCUMENTS

| | | |
|---|---|---|
| EP | 2569844 | 3/2013 |
| ES | 2362122 | 6/2011 |
| JP | 2008546591 | 12/2008 |
| JP | 2009538782 | 11/2009 |
| KR | 20070084165 | 8/2007 |
| WO | WO2006054898 | 5/2006 |
| WO | WO2007002391 | 1/2007 |
| WO | WO2007142537 | 12/2007 |
| WO | WO 2011/072835 * | 6/2011 |
| WO | WO2011072835 | 6/2011 |
| WO | WO2011124470 | 10/2011 |
| WO | WO2012055867 | 5/2012 |
| WO | WO2012080241 | 6/2012 |

OTHER PUBLICATIONS

Kongsberg, "A New Concept for Fuel Tight DP Control", Dynamic Positioning Conference, Sep. 18-19, 2001.

* cited by examiner

DYNAMIC POSITIONING SYSTEMS AND METHODS

TECHNICAL FIELD

The technical field relates generally to dynamic positioning systems and methods.

BACKGROUND

Dynamic positioning (DP) systems are systems that control propellers and thrusters to maintain a vessel's position and heading. DP systems facilitate performing operations where mooring or anchoring is not feasible. For example, DP systems are used by much of the offshore oil industry where anchoring is not feasible due to deep water, congestion from pipelines, or other problems.

DP systems are energy intensive because fuel is used to run thrusters to counteract environmental forces that can move the vessel out of position. For example, existing DP systems that are constantly adjusting thrust demands to maintain the position of the vessel.

SUMMARY OF EMBODIMENTS OF THE PRESENT INVENTION

The various embodiments of the present disclosure overcome many of the shortcomings of the prior art. The present disclosure provides systems and methods of dynamic positioning that provide fuel savings, reduced emissions, and reduced thruster activity.

According to an exemplary embodiment, a dynamic positioning system includes a controller configured to control thrusters. The controller includes a processor and a memory having stored thereon computer-executable instructions which, when executed by the processor, cause the processor to perform operations. The operations by the processor include predicting a maximum radial position error and a final radial position error; and calculating thrust forces for efficient control if each of a start position is inside a working area, the maximum radial position error is inside a operating area, and the final radial position error is inside the working area. Calculating the thrust forces for efficient control includes calculating thrust forces that are substantially constant with respect to thrust forces at a previous time step.

The start position is the position of the vessel at a beginning of the time period. The maximum radial position error is a maximum distance between a position of a vessel and a target position during a time period. The final radial position error is a distance between the position of the vessel and the target position at an end of the time period.

According to an exemplary embodiment, a dynamic positioning system includes a controller that is configured to control thrusters. The controller includes a processor and a memory having stored thereon computer-executable instructions which, when executed by the processor, cause the processor to perform operations. The operations performed by the processor include predicting a maximum heading error and a final heading error; and calculating a thrust moment for efficient control if each of a start heading is inside a working angle range, the maximum heading error is inside an outer limit of an operating angle range, and the final heading error is inside an inner limit of the working angle range. Calculating the thrust moment for efficient control includes calculating a thrust moment that is substantially constant with respect to a thrust moment at a previous time step.

The start heading is a heading of the vessel at a beginning of the time period. The maximum heading error is a maximum angle between a heading of a vessel and a nominal aim during a time period. The final heading error is an angle between the heading of the vessel and the nominal aim at an end of the time period.

The foregoing has broadly outlined some of the aspects and features of the various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

DETAILED DESCRIPTION OF VARIOUS EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Exemplary embodiments are described in the context of dynamic positioning of a ship. However, the description is applicable to other vessels. As used herein, the term "vessel" includes ships, drilling rigs, platforms, semi-submersible mobile offshore drilling units (MODU), oceanographic research vessels, cruise ships, and other structures that float on the water surface. The disclosure is relevant to applications in deep water (e.g., ocean applications) and shallow water applications (e.g., freshwater lakes).

Figure 1:
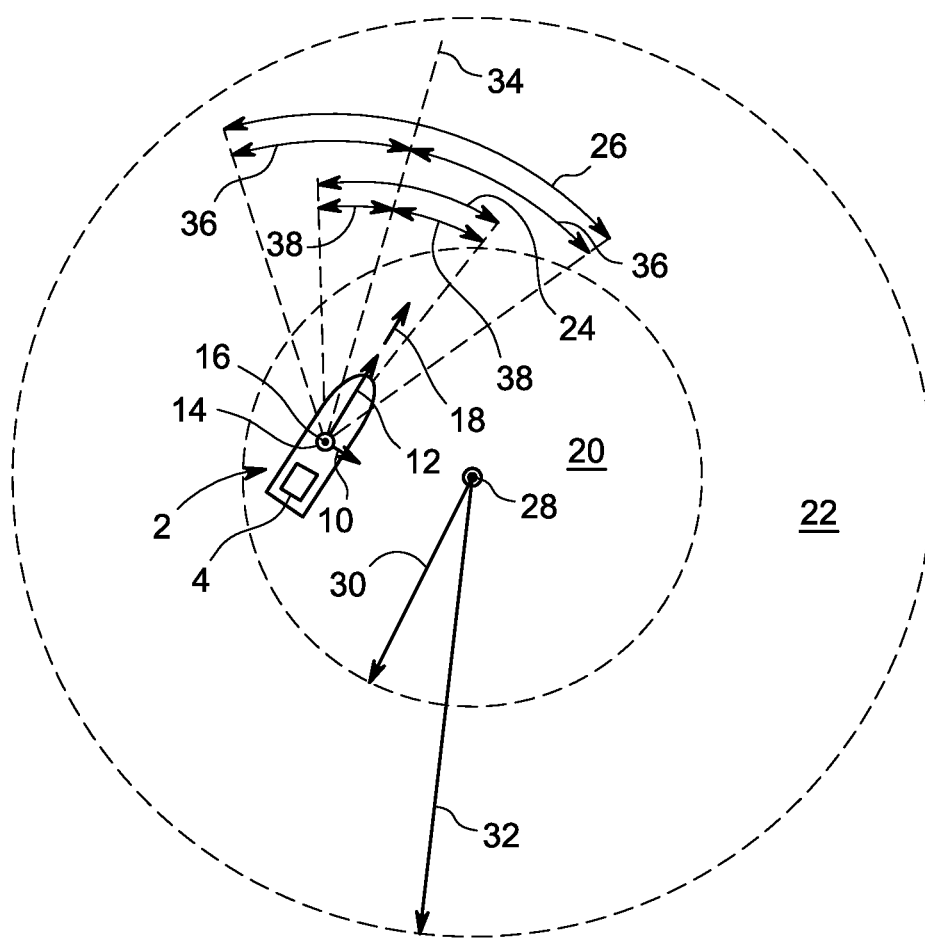
FIG. 1 is a schematic illustration of an exemplary embodiment of a ship including a DP system.

Referring to FIG. 1, movement of a ship 2 is by three translational axes (surge, sway and heave) and three rotational axes (roll, pitch and yaw). A DP system 4 controls movement of the ship 2 in the horizontal plane (e.g., on the surface of the water). Movements in the horizontal plane include translation along a surge axis 12, translation along a sway axis 10, and rotation about a yaw axis 14 (positive direction is out of the page). The sway axis may be referred to as the x-axis, the surge axis may be referred to as the y-axis, and the yaw axis may be referred to as the z-axis.

The origin of the sway axis 10, the surge axis 12, and the yaw axis 14 represents a position 16 ($p$) of the ship 2. A heading 18 ($\psi$) of the ship 2 is in a direction along the surge axis 12. The DP system 4 is configured to maintain the position 16 within a working area 20 and an operating area 22. The DP system 4 is also configured to maintain the heading 18 within a working angle range 24 and an operating angle range 26.

The working area 20 and the working angle range 24 define limits for efficient operation (e.g., a soft limit). The operating area 22 and the operating angle range 26 define maximum limits (e.g., hard limits). The maximum limits are outside the limits for efficient operation.

The size and shape of the operating area 22 can be based on operational concerns such as the safety of personnel, equipment, or the environment. For example, the operating area 22 is an area in which the ship 2 can be positioned without damaging risers that are connected to the ship 2 and to a position on a seabed.

The working area 20 is an area inside the operating area 22 where operation is more efficient. For example, the working area 20 is defined with respect to the operating area 22 such that there is a sufficient amount of operating area 22 outside of the working area 20, which allows the DP system 4 time to respond and maintain the safety of the ship 2.

The working area 20 and the operating area 22 may be any shape. For purposes of teaching, the working area 20 and the operating area 22 have outer edges that are concentric circles. A center point 28 is the center of the working area 20 and the operating area 22. For example, the center point 28 represents a position where a riser is connected to a seabed. The working area 20 is a circle defined by an inner radius 30 ($R_{in}$) and the operating area 22 is a circle defined by an outer radius 32 ($R_{out}$). The outer radius 32 is greater than the inner radius 30. For example, the inner radius 30 is determined as $R_{in}=R_{out}/2$.

The working angle range 24 and the operating angle range 26 are defined with respect to a nominal aim 34. The operating angle range 26 includes a hard, outer limit (e.g., each limit is the nominal aim 34+/− an outer limit 36 ($\delta_{out}$)) and the working angle range 24 is an inner, soft limit (e.g., each limit is the nominal aim 34+/− an inner limit 38 ($\delta_{out}$)). For example the inner limit 38 is related to the outer limit 36 according to $\delta_{in}\delta_{out}/2$.

Selection of a small range for each of the working angle range 24 and the operating angle range 26 has been shown to reduce thruster wear and tear and also largely removes heading 18 oscillations, which can be irritating. For example, an outer limit 36 of two degrees and an inner limit 38 of one degree has been found to reduce thruster activity.

Figure 2:
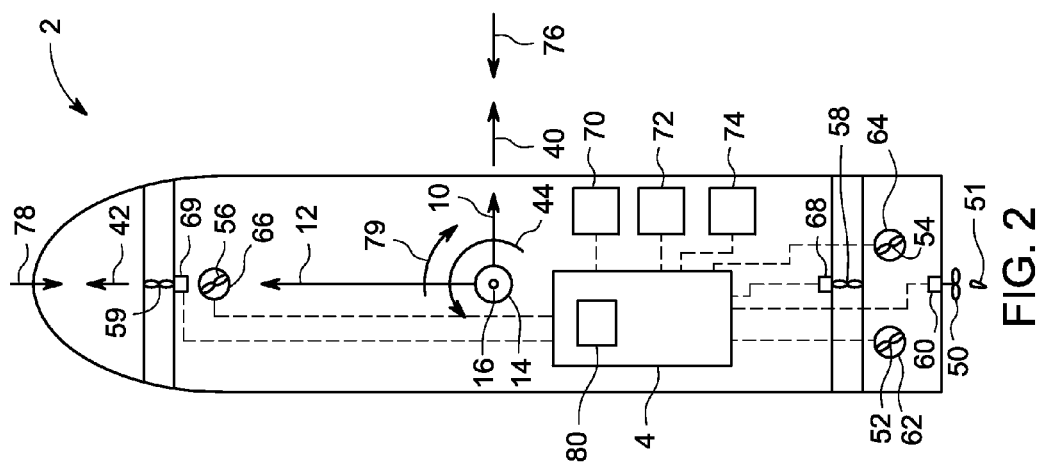
FIG. 2 is a schematic illustration of the ship and DP system of FIG. 1.

Referring to FIG. 2, the DP system 4 controls the force applied by thrusters (thrust forces) to control the position 16 and the heading 18. For purposes of teaching, the overall force applied by thrusters along each of the sway axis 10 and the surge axis 12, and the moment applied by the thrusters about the yaw axis 14, is represented by a sway thrust force 40 ($F_{tx}$), a surge thrust force 42 ($F_{ty}$), and a thrust moment 44 ($F_{tm}$). The sway thrust force 40 is the thrust force component along the sway axis 10, the surge thrust force 42 is the thrust force component along the surge axis 12, and the thrust moment 44 is the moment about the yaw axis 14.

As used herein, the term thruster includes any propulsive device or positioning device including propellers, thrusters, rudders, and the like. The thrusters are arranged to translate and rotate the ship 2 in the horizontal plane. Exemplary thrusters include a main propeller 50, a rudder 51, azimuth thrusters 52, 54, 56 and tunnel thrusters 58, 59.

The main propeller 50 is aligned with the surge axis 12. The rudder 51 sits behind the main propeller 50 to deflect the wake and thereby produce sideways thrust. The azimuth thrusters 52, 54, 56 are mounted beneath the hull of the ship 2 and are configured to rotate to provide thrust in any direction. For example, the azimuth thrusters 52, 54, 56 are able to rotate to provide thrust parallel to either or both of the sway axis 10 and the surge axis 12. Tunnel thrusters 58, 59 are fitted into tunnels that go through the hull of the ship 2. The tunnels are parallel to the sway axis 10.

A motor drives each thruster. Each motor is powered by the electrical power system of the ship 2. To control each thruster, the DP system 4 sends a command to a motor 60, 62, 64, 66, 68, 69 which then drives a respective one of the main propeller 50, the azimuth thrusters 52, 54, 56, and the tunnel thrusters 58, 59. In addition, some thrusters use variable pitch propellers. To change the thrust, the DP system 4 sends a command to a mechanical system that alters the pitch of the propeller blades. The rudder 51 is driven by a motor (e.g., motor 60) to alter the angle.

The DP system 4 controls the thrusters in part in response to input data or information that is received from various systems including environmental systems 70, position reference systems 72, and a control panel 74.

Environmental systems 70 are configured to measure or calculate external forces including wind, wave flux, current, and the like. For example, environmental systems include wind sensors and motion sensors. This information is combined with measurements from the position reference systems 72 to determine the magnitude and direction of environmental forces. For example, the environmental systems 70 include a model of the ship 2 that includes information pertaining to the wind and current drag of the ship 2. The measurements from the positions reference systems 72 and the environmental systems 70 may be used directly, may be filtered to remove noise, or may be combined using, for example, a Kalman filter algorithm to provide estimates of positions, velocities, forces, etc.

For purposes of teaching, overall force applied by external forces along each of the sway axis 10, the surge axis 12, and the yaw axis 14 is represented by a sway external force 76 ($F_{ex}$), a surge external force 78 ($F_{ey}$), and an external turning moment 79 ($F_{en}$). The sway external force 76 is the external force component along the sway axis 10, the surge external force 78 is the external force component along the surge axis 12, and the external turning moment 79 is the external moment about the yaw axis 14.

Position reference systems 72 are configured to measure or calculate the position 16 and the heading 18. Exemplary position reference systems include Doppler logs, risers, taut wire systems, acoustic position measurement systems, global positioning systems, gyrocompasses, combinations thereof, and the like.

The control panel 74 is a user interface through which an operator can manually enter information. For example, any or each of the center point 28, the inner radius 30, the outer radius 32, the outer limit 36, and the inner limit 38 can be manually selected by an operator. Alternatively, an operator can enter other information and the control panel 74 will automatically select the areas and limits. For example the control panel 74 can select the inner radius 30 and the outer radius 32 based on the type of ship 2 and the equipment attached to the ship 2.

Figure 3:
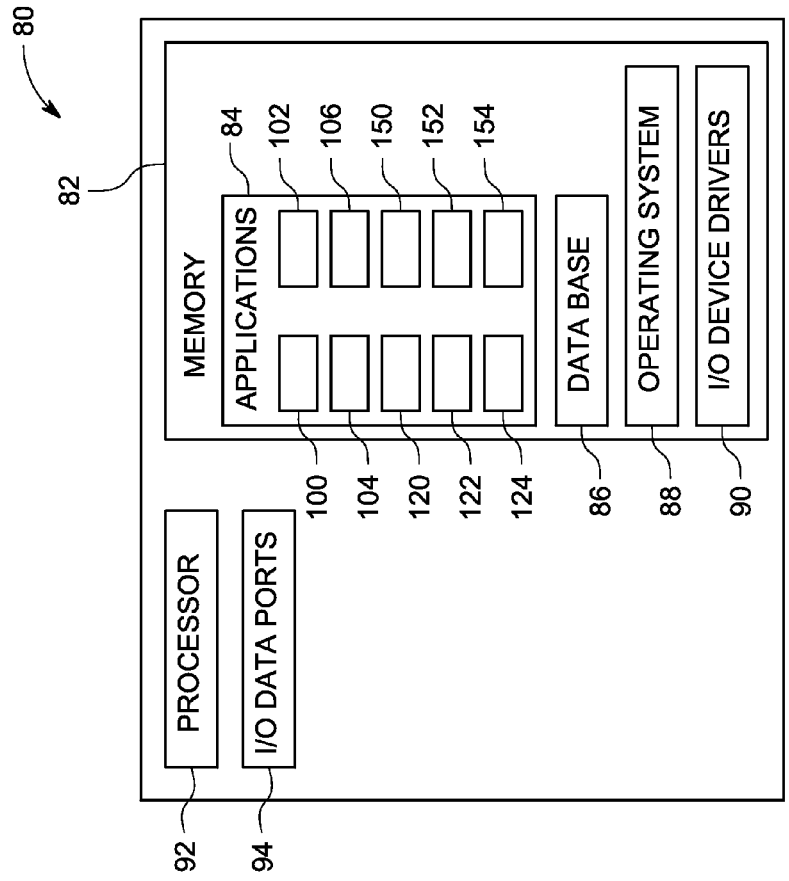
FIG. 3 is a schematic illustration of a controller of the DP system of FIG. 2.

Referring to FIG. 3, the DP system 4 includes a controller 80 that is configured to determine or calculate the sway thrust force 40, the surge thrust force 42, and the thrust moment 44. The controller then converts the thrust forces and thrust moment into thrust forces to be applied by each thruster and sends a signal to each respective motor to control the thrust of each thruster.

The controller includes a memory 82. The memory 82 may include several categories of software and data used in the controller 80, including, applications 84, a database 86, an operating system (OS) 88, and input/output (I/O) device drivers 90.

As will be appreciated by those skilled in the art, the OS 88 may be any operating system for use with a data processing system. The I/O device drivers 90 may include various routines accessed through the OS 88 by the applications 84 to communicate with devices, and certain memory components. The applications 84 can be stored in the memory 82 and/or in a firmware (not shown) as executable instructions, and can be executed by a processor 92. The applications 84 include various programs that, when executed by the processor 92, implement the various features of the controller 80, including applications described below. The applications 84 may be applied to data stored in the database 86, such as the specified parameters, along with data, e.g., received via the I/O data ports 94. The database 86 represents the static and dynamic data used by the applications 84, the OS 88, the I/O device drivers 90 and other software programs that may reside in the memory.

While the memory 82 is illustrated as residing proximate the processor 92, it should be understood that at least a portion of the memory 82 can be a remotely accessed storage system, for example, a server on a communication network, a remote hard disk drive, a removable storage medium, combinations thereof, and the like. Thus, any of the data, applications, and/or software described above can be stored within the memory 82 and/or accessed via network connections to other data processing systems (not shown) that may include a local area network (LAN), a metropolitan area network (MAN), or a wide area network (WAN), for example.

It should be understood that FIG. 3 and the description above are intended to provide a brief, general description of a suitable environment in which the various aspects of some embodiments of the present disclosure can be implemented. While the description refers to computer-readable instructions, embodiments of the present disclosure also can be implemented in combination with other program modules and/or as a combination of hardware and software in addition to, or instead of, computer readable instructions.

The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The applications 84 include a position prediction application 100, a position control selection application 102, a heading prediction application 104, and a heading control selection application 106. The applications 84 also include a scaled position control application 120, an optimized position control application 122, an efficient position control application 124, a scaled heading control application, 150, an optimized heading control application 152, and an efficient heading control application 154.

The controller 80 is configured to determine the sway thrust force 40, the surge thrust force 42, and the thrust moment 44 and to send a signal to the motors to apply the determined thrusts and thrust moment with the thrusters. Position control is first described in further detail followed by heading control.

Figure 4:
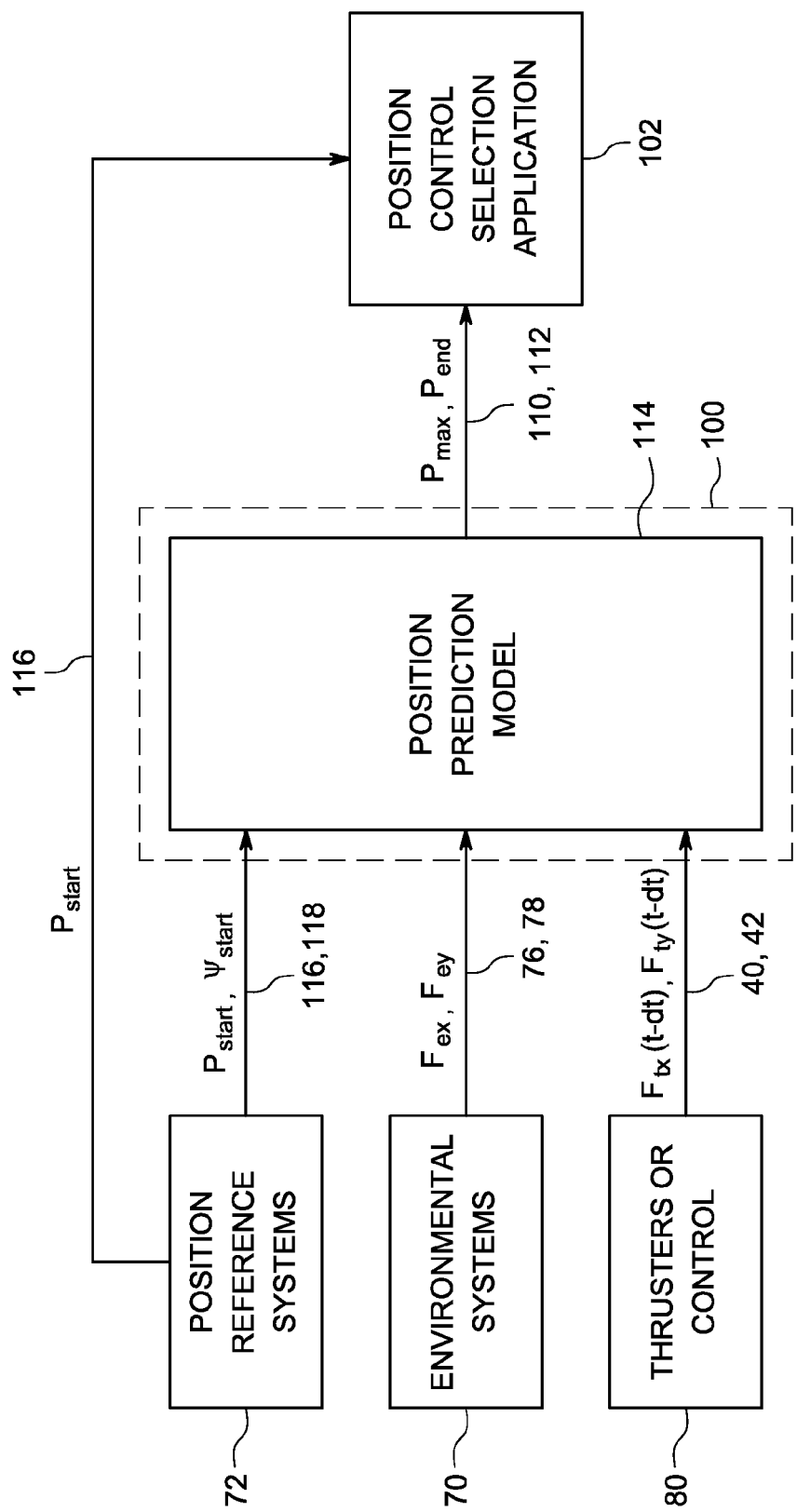
FIG. 4 is a flow diagram illustrating a position prediction application and a position control selection application of the controller of FIG. 3.

Referring to FIG. 4, the position prediction application 100 predicts a maximum radial position error 110 ($p_{max}$) within a prediction horizon $T_{pred}$ (a time period, e.g., one hundred seconds) and a final radial position error 112 ($p_{end}$) at the end of the prediction horizon $T_{pred}$. The maximum radial position error 110 is the greatest distance between the position 16 and the center point 28 during the prediction horizon $T_{pred}$. The final radial position error 112 is the distance between the position 16 and the center point 28 at the end of the prediction horizon $T_{pred}$.

The maximum radial position error 110 and the final radial position error 112 are predicted using a position prediction model 114 of the ship 2. The position prediction model 114 predicts the maximum radial position error 110 and the final radial position error 112 based on a start position 116 ($p_{start}$) (i.e., position 16 at the beginning of the prediction horizon $T_{pred}$), a start heading 118 ($\omega_{start}$) (i.e., heading 18 at the beginning of the prediction horizon $T_{pred}$), the sway external force 76, the surge external force 78, the sway thrust force 40, and surge thrust force 42. An exemplary model is given as:

for $t=1$ to $T_{pred}$ with a time step $dt$ $a_x(t)=((F_{ex}+F_t)-u_x(t-dt)*dl_x-u_x(t-dt)*\text{abs}(u_x(t-dt))*dnl_x)/m_x;$ $u_x(t)=u_x(t-dt)+a_x(t)*dt;$ $x(t)=x(t-dt)+u_x(t)*dt;$ $a_y(t)=((F_{ey}+F_{ty})-u_y(t-dt)*dl_y-u_y(t-dt)*\text{abs}(u_y(t-dt))*dnl_y)/m_y;$ $u_y(t)=u_y(t-dt)+a_y(t)*dt;$ $y(t)=y(t-dt)+u_y(t)*dt;$ $p(t)=\text{sqrt}(x(t)^2+y(t)^2);$ end $p_{end}=p(T_{pred});$ $p_{max}=\text{maximum}(p(t));$ where t is the time of prediction for each iteration; dt is the step duration between iterations of the model (e.g., one second); $T_{pred}$ is the duration of the prediction; $a_x(t)$ and $a_y(t)$ are the acceleration at time t in ur (y) and sway (x) axes; $u_x(t)$ and $u_y(t)$ are the velocity at time t in each axis ($u_x(0)$ and $u_y(0)$ are the initial velocities provided to the model, for example by the position reference systems 72); x(t) is the position at time t in the sway axis; y(t) is the position at time t in the surge axis; $F_{ex}$, $F_{ey}$ are external forces; $F_{tx}$, $F_{ty}$ are thrust forces; $dl_x$, $di_y$ are linear drag terms; $dnl_x$, $dnl_y$=nonlinear drag terms; and $m_x$, $m_y$ are masses of the ship 2, including added mass, in each axis.

The start position 116 and the start heading 118 are measured by the position reference system 72; the sway external force 76 and the surge external force 78 are measured by the environmental systems 70; and the sway thrust force 40 and the surge thrust force 42 are the thrusts determined at the previous time step. The positions, heading, velocities and external forces may alternatively be estimated using a Kalman filter algorithm or the like.

Figure 5:
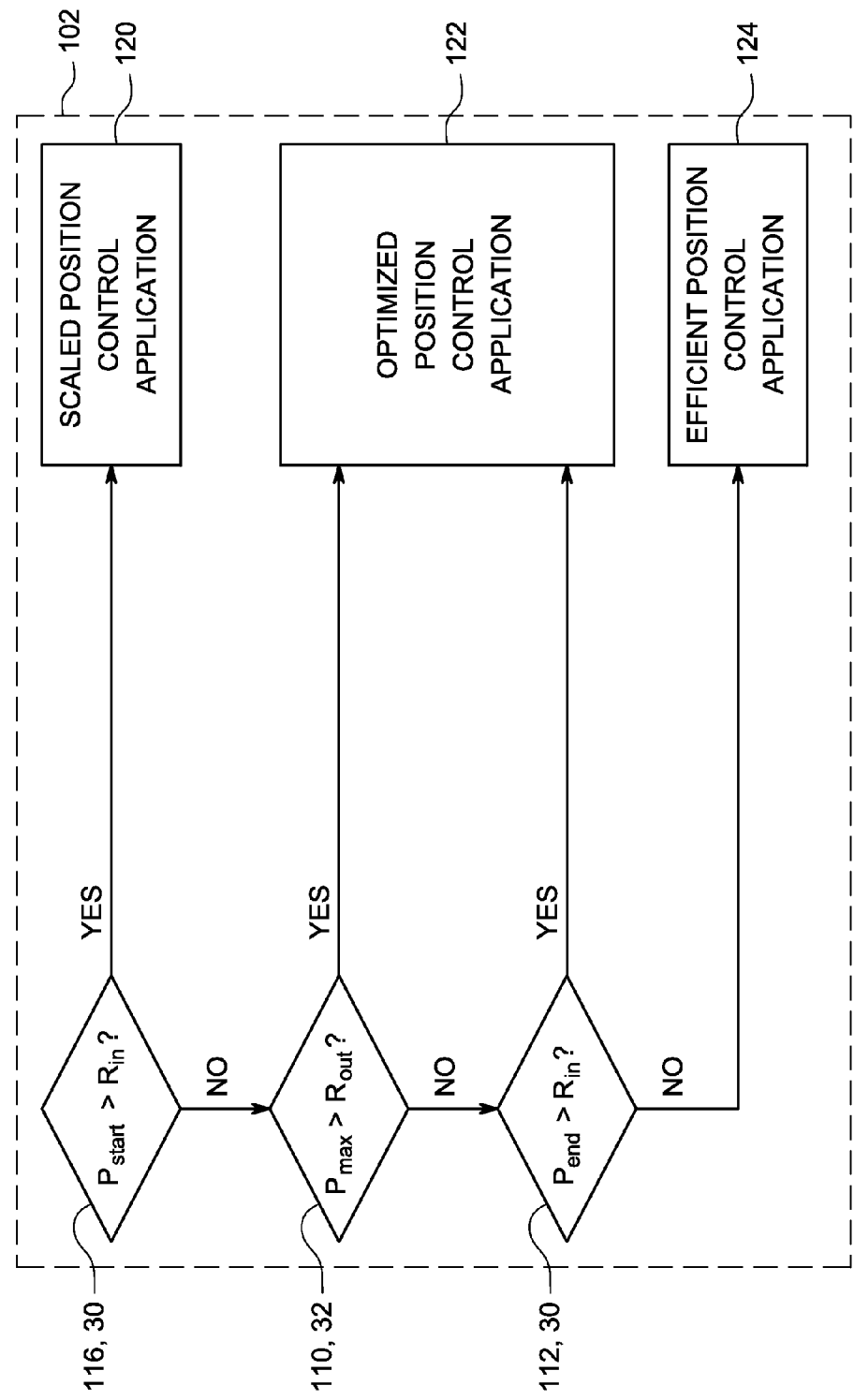
FIG. 5 is a flow diagram illustrating the position control selection application of FIG. 4.

Referring to FIG. 5, the position control selection application 102 selects an application to calculate or determine the sway thrust force 40 and the surge thrust force 42. The position control selection application 102 selects from the scaled position control application 120, the optimized position control application 122, and the efficient position control application 124. The scaled position control application 120 is configured to keep the ship 2 inside the operating area 22; the optimized position control application 122 is configured to keep the ship 2 near the working area 20; and the efficient position control application 124 keeps the thrust demand the same as the previous time step.

The position control selection application 102 selects between the scaled position control application 120, the optimized position control application 122, and the efficient position control application 124 based on the start position 116, the maximum radial position error 110, and the final radial position error 112. The start position 116 is measured or calculated by the position reference system 72. The maximum radial position error 110 and the final radial position error 112 are calculated by the position prediction application 100.

If the start position 116 is greater than the inner radius 30 ($p_{start} > R_{in}$) (i.e., the position 16 is already outside the working area 20), then the scaled position control application 120 is selected.

If the maximum radial position error 110 is greater than the outer radius 32 ($p_{max} > R_{out}$) or the final radial position error 112 is greater than the inner radius 30 ($p_{end} > R_{in}$) (i.e., the position 16 will exit the operating area 22 at any point during the prediction horizon $T_{pred}$ or the position 16 will be outside the working area 20 at the end of the prediction horizon $T_{pred}$), then the optimized position control application 122 is selected. Otherwise, efficient position control application 124 is selected.

The scaled position control application 120 is now described in further detail. In general, scaled position control application 120 uses gains that are scaled according to a distance of the start position 116 outside the working area 20. The scaled position control application 120 calculates or determine the sway thrust force 40 and the surge thrust force 42 in order to keep the ship 2 away from the outer edge of the operating area 22.

For purposes of teaching, scaled position control application 120 includes a proportional-integral-differential (PID) control algorithm. Particularly, scaled position control application 120 includes independent proportional-differential (PD) control algorithms. A surge PD control algorithm determines the surge thrust force 42 to be applied to the ship 2 along the surge axis 12 and a sway PD control algorithm determines the sway thrust force 40 to be applied to the ship 2 along the sway axis 10.

Each PD control algorithm includes a proportional component and a differential component. The PD control algorithm for the sway thrust force $F_{tx}$ is now described in detail. The PD control algorithm for the surge thrust force F is substantially similar to that of the sway thrust force $F_{tx}$ and, for purposes of clarity, is not described in detail.

An exemplary an PD control algorithm for sway thrust force $F_{tx}$ is given as:

$$F_{tx}(t) = F_{px}(t) + F_{dx}(t)$$

where $F_{px}(t)$ is the proportional component of thrust at a time t and $F_{dx}(t)$ is the differential component of thrust at a time t.

The differential component $F_{dx}$, is given as:

$$F(k) = k'_v [E_x(t) E_x(t-dt)]$$

where $k'_v$ is a differential gain and $E_x(t)$ is the distance between the position 16 of the ship 2 and an ideal target position along the sway axis 10 at times t, t−dt.

The proportional component $F_{px}(t)$ is given as:

$$F_{px}(t) = k'_p * e_x(t)$$

where $k'_p$, is an proportional gain and $e_x(t)$ is the distance between the position 16 of the ship 2 and an ideal target position along the sway axis 10 at time t.

The values of $e_x$ and $E_x$ depend upon the heading 18, the working area 20, and the ideal target position or other reference position. For example, the target position or reference position is the center point 28 or a position on the boundary of the working area 20.

Each of the differential gain $k'_v$ and the proportional gain $k'_p$ is a DP gain $k_v$, $k_p$ that is scaled. This scaling provides that the gains $k'_v$, $k'_p$, are zero at the edge of the working area 20 and match the DP gains $k_v$, $k_p$, at the edge of the operating area 22.

The DP gains $k_v$, $k_p$ are scaled by a multiplier γ that is based on the start position $p_{start}$. The multiplier γ is given as:

$$\gamma = (p_{start} - R_{in})/(R_{out} - R_{in})$$

where $$0 \leq \gamma \leq 1.$$

The proportional gain $k'_p$ and the velocity gain $k'_v$ are given as:

$$k'_p = \gamma k_p$$

and $$k'_v = \text{sqrt}(\gamma) k_v$$

The square-root is used on the multiplier γ for the velocity gain $k'_v$ to provide a similar level of damping in closed-loop for any DP gain $k_v$. If the inner radius $R_{in}$ is set to zero, the position control selection application 102 always selects scaled position control application 120 to calculate or determine the sway thrust force $F_{tx}$ and the surge thrust force $F_{ty}$.

The optimized position control application 122 determines sway thrust force $F_{tx}$ and surge thrust force $F_{ty}$ that use the minimum power. The optimization incorporates constraints including:

$$p_{max} \leq R_{out}$$

$$p_{end} \leq R_{in}$$

$$|F_{tx}(t)| \leq F_{tx}^{max}$$

$$|F_{ty}(t)| \leq F_{ty}^{max}$$

where $F_{tx}^{max}$ and $F_{ty}^{max}$ are maximum values for the sway thrust force $F_{tx}$ and the surge thrust force $F_{ty}$.

The optimized position control application 122 includes an unconstrained algorithm with the constraints implemented as barrier functions that are included in the cost. For example, the algorithm is the Nelder-Mead simplex algorithm which finds a minimum by forming a simplex in the solution space. Here, the simplex is a triangle whose points are different selections of the sway thrust force $F_{tx}$ and the surge thrust force $F_{ty}$. A cost function J is evaluated at each point of the simplex and the worst point is then replaced with a new point that is the reflection of the old point in the line joining the other two.

The cost function J is given as $$J(F_{tx}+F_{ex})^2+(F_{ty}+F_{ey})^2+W(p_{end}-R_{in})$$

where the sway thrust force $F_{tx}$ and the surge thrust force $F_{ty}$ are optimized or calculated, the final radial position error $p_{end}$ is calculated by the position prediction model 114 each time the cost function J is evaluated, and W is a weight. For example, the weight W is much larger than one to provide that the final term of the cost function J dominates the cost if the position 16 of the ship 2 is predicted to finish outside the working area 20 at the end of the prediction horizon $T_{pred}$.

The cost function J (i.e., cost) is based on the deviation of the sway thrust force $F_{tx}$ and the surge thrust force $F_{ty}$ from opposition to the sway external force $F_{ex}$ and the surge external force $F_{ey}$. The cost function J is further based on the predicted distance of the final radial position error $p_{end}$ outside the working area 20. The combination of these costs provides, for example, that the position 16 does not sit on the edge of the working area 20.

The efficient position control application 124 calculates or determines the sway thrust force $F_{tx}$ and the surge thrust force $F_{ty}$ to keep the sway thrust force $F_{tx}$ and the surge thrust force $F_{ty}$ constant. For example, the sway thrust force $F_{tx}$ at time t is set equal to the sway thrust force $F_{tx}$ at time t−dt($F(t)=F_{tx}(t-dt)$) and the surge thrust force $F_{ty}$ at time t is set equal to the surge thrust force $F_{ty}$ at time t−dt($F_{ty}(t)=F_{ty}(t-dt)$). Efficiency is achieved where the thrust forces are kept constant.

The controller 80 controls the heading 18 with principles that are similar to those described above with respect to the control of position 16.

Figure 6:
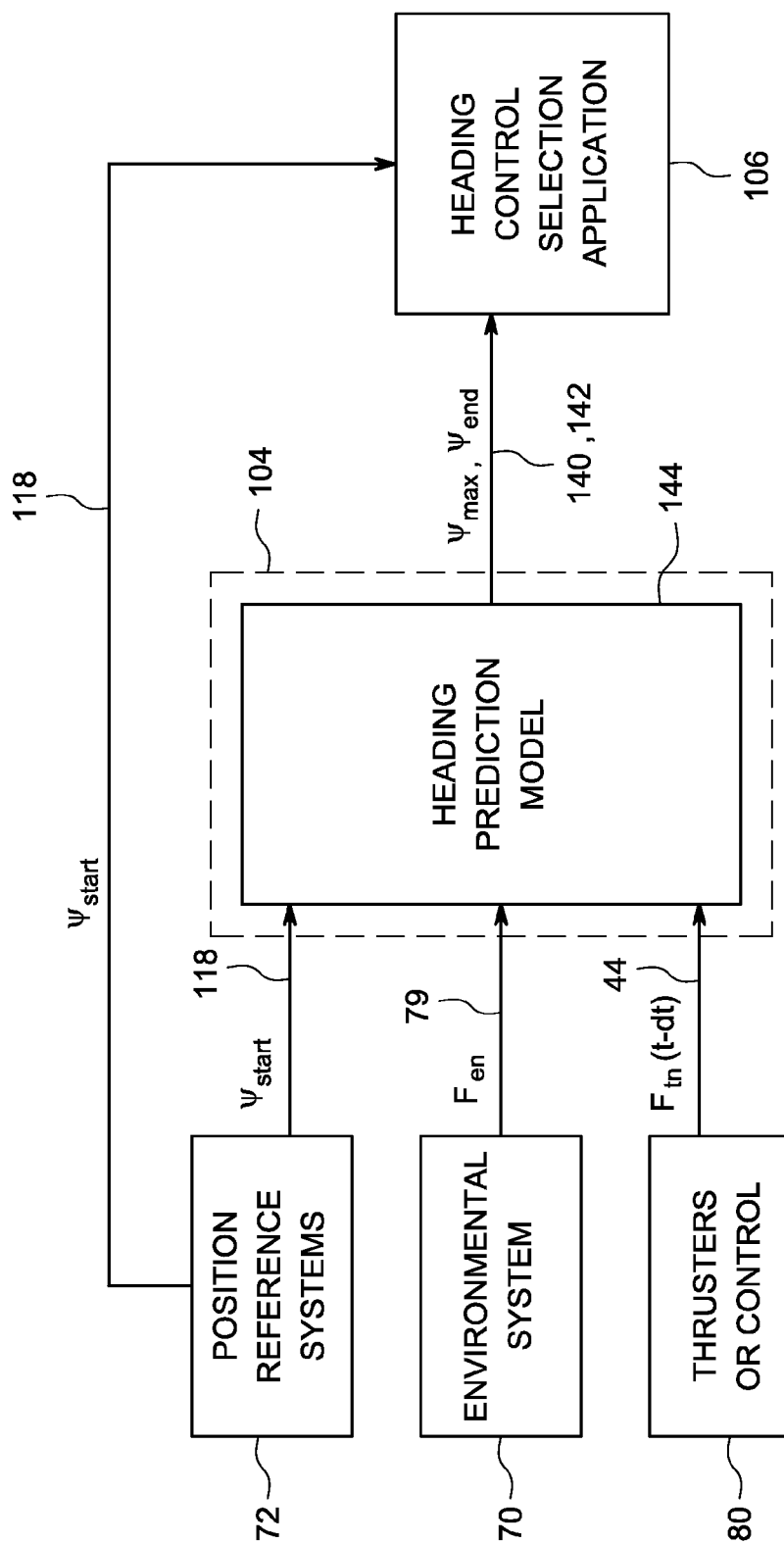
FIG. 6 is a flow diagram illustrating a heading prediction application and a heading control selection application of the controller of FIG. 3.

Referring to FIG. 6, at each time t, the heading prediction application 104 predicts a maximum heading error 140 ($\psi_{max}$) and a final heading error 142 ($\psi_{end}$). The maximum heading error 140 is the difference between the nominal aim 34 and a heading 18 that is furthest from the nominal aim 34 during the prediction horizon $T_{pred}$. The final heading error 142 is the difference between the nominal aim 34 and a heading 18 at the end of the prediction horizon $T_{pred}$.

The heading prediction application 104 predicts the maximum heading error 140 and the final heading error 142 based on a heading prediction model 144 of the rotation of the ship 2 about the yaw axis 14. The heading prediction model 144 is based on a start heading 118 ($\psi_{start}$) (e.g., the heading 18 at the beginning of the prediction horizon $T_{pred}$), the external turning moment 79 ($F_{eh}$), and the thrust moment 44 ($F_{th}$). For example, the heading prediction model 144 is given as:

for $t=1$ to $T_{pred}$ with a time step $dt$ $a_h(t)=((F_{eh}+F_{th})-u_h(t-dt)*dl_h-u_h(t-dt)*abs(u_h(t-dt))*dnl_h)/m_h;$ $u_h(t)=u_h(t-dt)+a_h(t)*dt;$ $\psi(t)=\psi(t-dt)+u_h(t)*dt;$ end $\psi_{end}=\psi(T_{pred});$ $\psi_{max}=\mathrm{maximum}(\psi(t))$ According to exemplary embodiments, the external turning moment $F_{eh}$ and the thrust moment $F_{th}$ are assumed to be constants. For example, the thrust moment $F_{th}$ at current time t is assumed to be the same as the thrust moment $F_{th}$ at the previous time t−dt($F_{th}(t)=F_{th}(t-dt)$).

Figure 7:
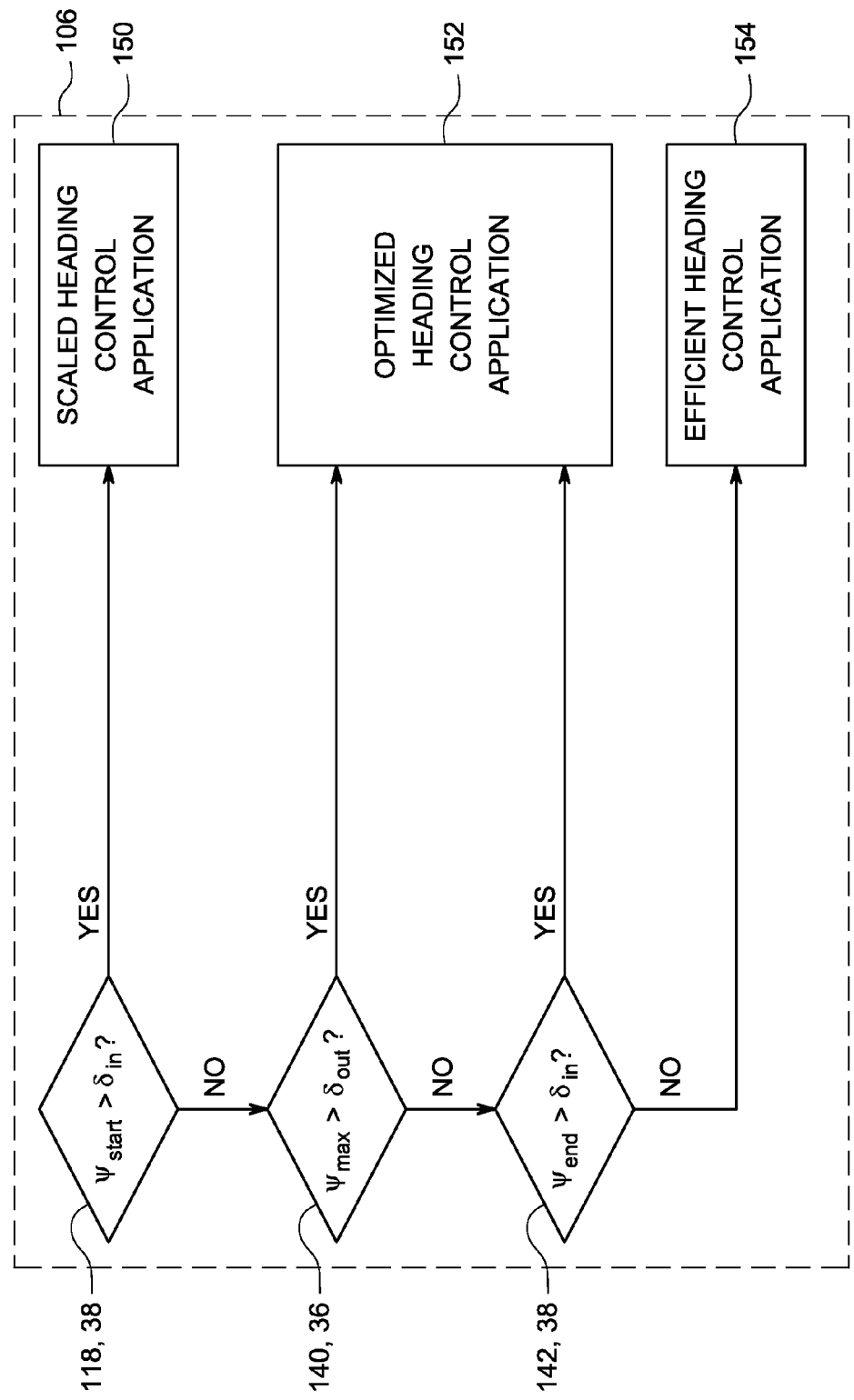
FIG. 7 is a flow diagram illustrating the heading control selection application of FIG. 6.

Referring to FIG. 7, the heading control selection application 106 selects an application to calculate the thrust moment 44. The heading control selection application 106 selects from a scaled heading control application 150, an optimized heading control application 152, and an efficient heading control application 154. The scaled heading control application 150 is configured to keep the heading 18 inside the operating angle range 26; the optimized heading control application 152 is configured to keep the heading 18 near the working angle range 24; and the efficient heading control application 154 keeps the thrust demand the same as the previous time step.

The heading control selection application 106 selects between the scaled heading control application 150, the optimized heading control application 152, and the efficient heading control application 154 based on the start heading 118, the maximum heading error 140, and the final heading error 142. The start heading 118 is measured or calculated by the position reference system 72. The maximum heading error 140 and the final heading error 142 are generated by the heading prediction application 104.

If the start heading 118 is greater than the inner limit 38 ($\psi_{start}>\delta_{in}$) (i.e. the heading 18 is already outside the working angle range 24) then the heading control selection application 106 selects scaled heading control application 150. If the maximum heading error 140 is greater than the outer limit 36 ($\psi>\delta_{out}$) or the final heading error 142 is greater than the inner limit 38 ($\psi_{end}>\delta_{in}$) (i.e., the heading 18 will exceed the outer limit 36 at any time during the prediction horizon $T_{pred}$ or the heading 18 will finish outside the inner limit 38 at the end of the prediction horizon $T_{pred}$) then the heading control selection application 106 selects the optimized heading control application 152. Otherwise, the heading control selection application 106 selects efficient heading control application 154.

The scaled heading control application 150 calculates the thrust moment 44 with an algorithm including gains that are scaled according a distance of the start heading 118 outside the inner limit 38.

The scaled heading control application 150 includes a PD algorithm. An exemplary PD control algorithm for thrust moment $F_{th}$ is given as:

$$F_{th}(t)=F_{ph}(t)+F_{dh}(t)$$

where $F_{ph}(t)$ is the proportional component of thrust moment at a time t and $F_{dh}(t)$ is the differential component of thrust moment at a time t.

The differential component $F_{dh}$ is given as:

$$F_{dh}(t)=k'_v[E_h(t)-E_h(t-dt)]$$

where $k'_v$ is a differential gain and $E_h(t)$ is the distance between the heading 18 of the ship 2 and an ideal target angle about the yaw axis 14 at times t, t−dt.

The proportional component $F_{ph}(t)$ is given as:

$$F_{ph}(t)=k'_p*e_h(t)$$

where $k'_p$ is an proportional gain and $e_h(t)$ is the distance between the heading 18 of the ship 2 and an ideal target angle about the yaw axis 14 at time t.

The values of $e_h$ and $E_h$ depend upon the heading 18, the working angle range 24, and the ideal target angle or other reference angle. For example, the target angle or reference angle is the nominal aim 34, which may be set by an operator.

Each of the velocity gain $k'_v$ and the proportional gain $k'_p$ is a DP gain $k_v$, $k_p$ that is scaled. This scaling provides that the gains $k'_v$, $k'_p$ are zero at the edge of the working angle range 24 and match the DP gains $k_v$, $k_p$ at the edge of the operating angle range 26.

The DP gains $k_v$, $k_p$ are scaled by a multiplier $\gamma$ based on the start heading $\psi_{start}$. The multiplier is given by:

$$\gamma=(\psi_{start}-\delta_{in})/(\delta_{out}\delta_{in})$$

where $$0\leq\gamma\leq1.$$

The differential gain $k'_v$ and the proportional gain $k'_p$ are given as:

$$k'_p=\gamma k_p$$

$$k'_v=\text{sqrt}(\gamma)k_v$$

The square-root is used on the multiplier $\gamma$ for the velocity gain $k_v$ to ensure a similar level of damping in closed-loop whatever the scaling.

The optimized heading control application 152 calculate the thrust moment 44 to minimize power used within constraints, including:

$$\psi_{max}\leq\delta_{out}$$

$$\psi_{end}\leq\delta_{in}$$

$$|F_{th}(t)|\leq F_{th}^{max}$$

where $F_{th}^{max}$ is a maximum value for the thrust moment $F_{th}$.

The optimized heading control application 152 includes an unconstrained algorithm with the constraints implemented as barrier functions that are included in the cost. The algorithm is the Nelder-Mead simplex algorithm, as described above. Here, the simplex is a line whose points are different selections of the thrust moment $F_{th}$. A cost function J is evaluated at each point of the simplex and the worst point is then replaced with a new point that is the reflection of the old point in the other point. The optimization is performed along a single axis, making the optimisation easier and quicker.

The cost function J is given as:

$$J=(F_{th}+F_{eh})^2+W(\psi_{end}-\delta_{in})$$

where the thrust moment $F_{th}$ is optimized or calculated, final heading $\psi_{end}$ is calculated by the heading prediction model 144 each time the cost function J is evaluated, and W is a weight. The weight W is much larger than one to provide that the final term dominates the cost function J when the heading 18 of the ship 2 is predicted to finish outside the inner limit 6, at the end of the prediction horizon $T_{pred}$.

The cost function J is based on the deviation of the thrust moment $F_{th}$ from opposition to the external moment $F_{eh}$. The cost function J is also based on deviation of the final heading error yr end from the inner limit $\delta_{in}$. The combination of these costs provides, for example, that heading 18 does not sit on the inner limit $\delta_{in}$.

The efficient heading control application 154 calculates or determines the thrust moment $F_{th}$ to keep the thrust moment $F_{th}$ constant. For example, the thrust moment $F_{th}$ at time step t is set equal to the thrust moment $F_{th}$ at time step t−dt ($F_{th}(t)=F_{th}(t-dt)$). Efficiency is achieved where the thrust moment is kept constant.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims or if they include equivalent structural elements with insubstantial differences from the literal language of the claims.

What is claimed is:

1. A dynamic positioning system, comprising
   a controller configured to control thrusters, comprising:
      a processor; and
      a memory having stored thereon computer-executable instructions which, when executed by the processor, cause the processor to perform operations comprising:
         predicting, by the processor, a maximum radial position error and a final radial position error, wherein the maximum radial position error is a maximum distance between a position of a vessel and a target position during a time period, and wherein the final radial position error is a distance between the position of the vessel and the target position at an end of the time period; and
         calculating, by the processor, thrust forces for efficient control when each of:
            a start position is inside a working area, wherein the start position is the position of the vessel at a beginning of the time period;
            the maximum radial position error is inside a operating area;
            the final radial position error is inside the working area;
   the calculating the thrust forces for efficient control comprising calculating, by the processor, thrust forces that are substantially constant with respect to thrust forces at a previous time step;
      calculating, by the processor, thrust forces for scaled control when the start position is outside the working area the calculation including a gain that is scaled based on a distance between the start position and an edge of the working area and wherein
   the gain is scaled by a multiplier based on:

$$\gamma=(p_{start}-R_{in})/(R_{out}-R_{in})$$

wherein pstart is the start position, Rin is a radius of the working area, and Rout is a radius of the operating area.

2. The dynamic positioning system of claim 1, wherein the gain is a proportional gain.

3. The dynamic positioning system of claim 1, wherein the gain is a velocity gain.

4. The dynamic positioning system of claim 1, the memory having stored thereon computer-executable instructions which, when executed by the processor, cause the processor to perform operations comprising:
   calculating, by the processor, thrust forces for optimized control when:
      the start position is inside the working area and at least one of:
         the maximum radial position error is outside the operating area; and
         the final radial position error is outside the working area;
   the calculation including minimizing a cost function, wherein the cost function is based on a distance between the final radial position error and an edge of the working area.

5. The dynamic positioning system of claim 4, wherein the cost function is further based on a difference between thrust force and an opposed external force.

6. The dynamic positioning system of claim 5, wherein a weight is applied to the distance between the final radial position error and the edge of the working area, wherein the weight is larger than one.

7. The dynamic positioning system of claim 4, wherein the cost function is based on:

$$J=(F_{tx}+F_{ex})^2+(F_{ty}+F_{ey})^2+W(p_{end}-R_{in})$$

where $F_{tx}$ is a sway thrust force, $F_{ty}$ is a surge thrust force, $F_{ex}$ is a sway external force, $F_{ey}$ is a surge external force, $p_{end}$ is the final radial position error, Rin is a radius of the working area, and W is a weight.

8. The dynamic positioning system of claim 1, the memory having stored thereon computer-executable instructions which, when executed by the processor, cause the processor to perform operations comprising:
predicting, by the processor, a maximum heading error and a final heading error, wherein the maximum heading error is a maximum angle between a heading of a vessel and a nominal aim during a time period, and wherein the final heading error is an angle between the heading of the vessel and the nominal aim at an end of the time period; and
calculating, by the processor, a thrust moment for efficient control when each of:
 a start heading is inside a working angle range, wherein the start heading is a heading of the vessel at a beginning of the time period;
 the maximum heading error is inside an outer limit of an operating angle range; and
 the final heading error is inside an inner limit of the working angle range;
the calculating the thrust moment for efficient control comprising calculating, by the processor, a thrust moment that is substantially constant with respect to a thrust moment at a previous time step.

9. The dynamic positioning system of claim 8, the memory having stored thereon computer-executable instructions which, when executed by the processor, cause the processor to perform operations comprising:
calculating, by the processor, a thrust moment for scaled control when the start heading is outside the working angle range; the calculation including a gain that is scaled based on a distance between the start heading and an inner limit of the working angle range.

10. The dynamic positioning system of claim 9, wherein the gain is a proportional gain.

11. The dynamic positioning system of claim 9, wherein the gain is a velocity gain.

12. The dynamic positioning system of claim 9, wherein the gain is scaled by a multiplier based on:

$$\gamma=(\psi_{start}-\delta_{in})/(\delta_{out}-\delta_{in})$$

wherein ψstart is the start heading, in is an inner limit of the working angle range, and δout is an outer limit of an operating angle range.

13. The dynamic positioning system of claim 9, the memory having stored thereon computer-executable instructions which, when executed by the processor, cause the processor to perform operations comprising:
calculating, by the processor, a thrust moment for optimized control when:
 the start heading is inside the working angle range and at least one of:
  the maximum heading error is outside the outer limit of the operating angle range; and
  the final heading error is outside the inner limit of the working angle range;
the calculation including minimizing a cost function, wherein the cost function is based on a distance between the final heading error and the inner limit of the working angle range.

14. The dynamic positioning system of claim 13, wherein the cost function is further based on a difference between the thrust moment and an opposed external moment.

15. The dynamic positioning system of claim 14, wherein a weight is applied to the distance between the final heading error and the inner limit of the working angle range, wherein the weight is larger than one.

16. The dynamic positioning system of claim 13, wherein the cost function is based on:

$$J=(F_{th}+F_{eh})^2+W(\psi_{end}-\delta_{in})$$

where $F_{th}$ is the thrust moment, $F_{eh}$ is an external moment, $\psi_{end}$ is a final heading, δin is the inner limit, and W is a weight.

17. A dynamic positioning system, comprising
a controller configured to control thrusters, comprising:
 a processor; and
 a memory having stored thereon computer-executable instructions which, when executed by the processor, cause the processor to perform operations comprising:
  predicting, by the processor, a maximum heading error and a final heading error, wherein the maximum heading error is a maximum angle between a heading of a vessel and a nominal aim during a time period, and wherein the final heading error is an angle between the heading of the vessel and the nominal aim at an end of the time period; and
  calculating, by the processor, a thrust moment for efficient control when each of:
   a start heading is inside a working angle range, wherein the start heading is a heading of the vessel at a beginning of the time period;
   the maximum heading error is inside an outer limit of an operating angle range; and
   the final heading error is inside an inner limit of the working angle range;
 the calculating the thrust moment for efficient control comprising calculating, by the processor, a thrust moment that is substantially constant with respect to a thrust moment at a previous time step.

18. The dynamic positioning system of claim 17, the memory having stored thereon computer-executable instructions which, when executed by the processor, cause the processor to perform operations comprising:
calculating, by the processor, a thrust moment for scaled control if the start heading is outside the working angle range; the calculation including a gain that is scaled based on a distance between the start heading and an inner limit of the working angle range; and
calculating, by the processor, a thrust moment for optimized control when:
 the start heading is inside the working angle range and at least one of:
  the maximum heading error is outside the outer limit of the operating angle range; and
  the final heading error is outside the inner limit of the working angle range;
the calculation including minimizing a cost function, wherein the cost function is based on a distance between the final heading error and the inner limit of the working angle range.

* * * * *